United States Patent Office 2,776,305
Patented Jan. 1, 1957

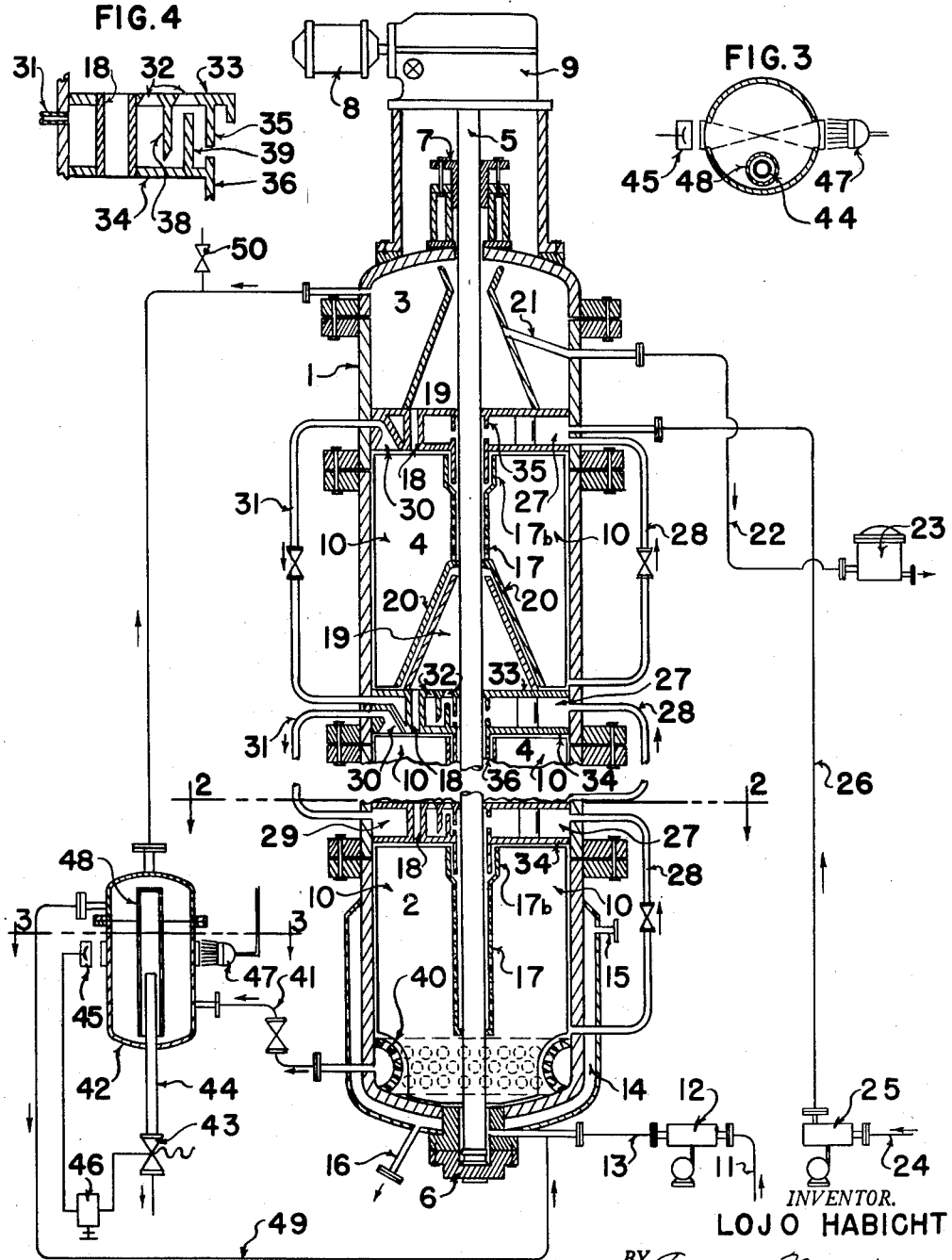

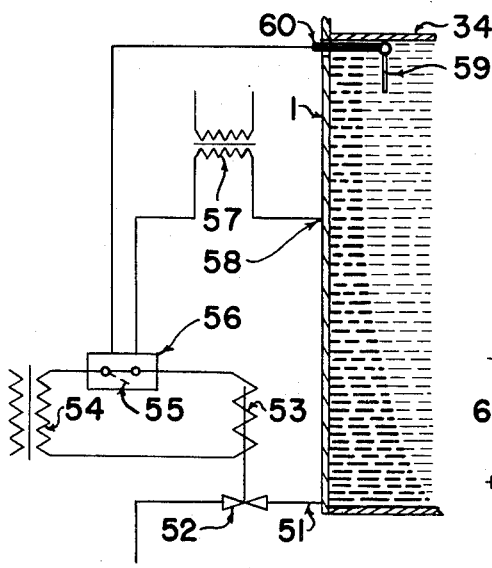
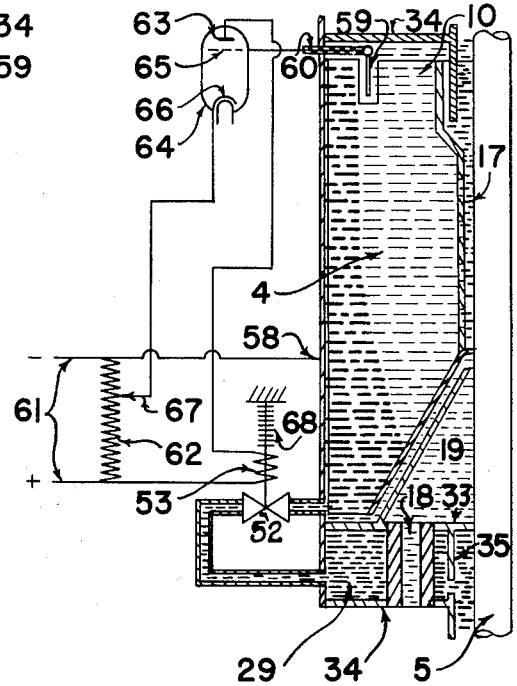
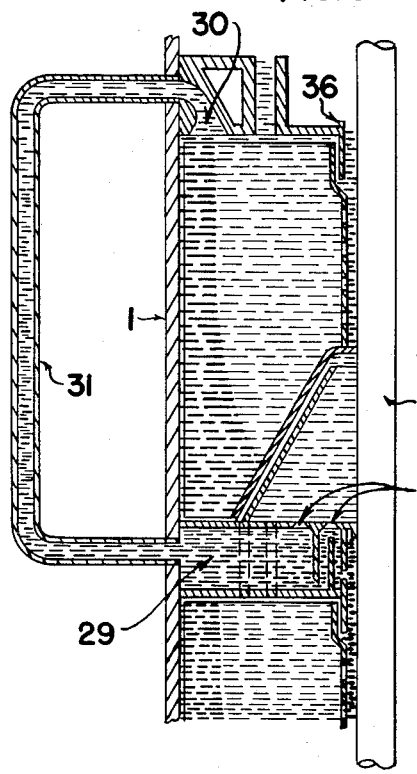
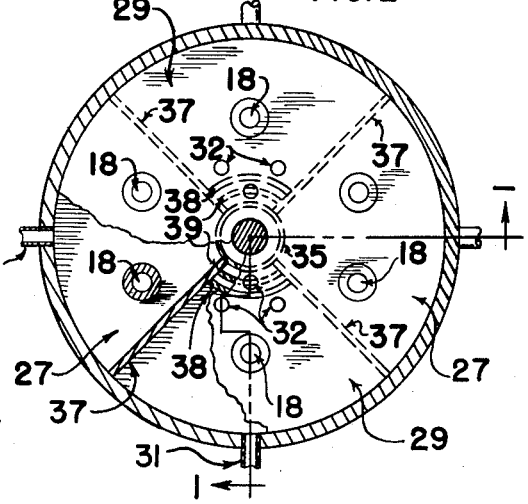

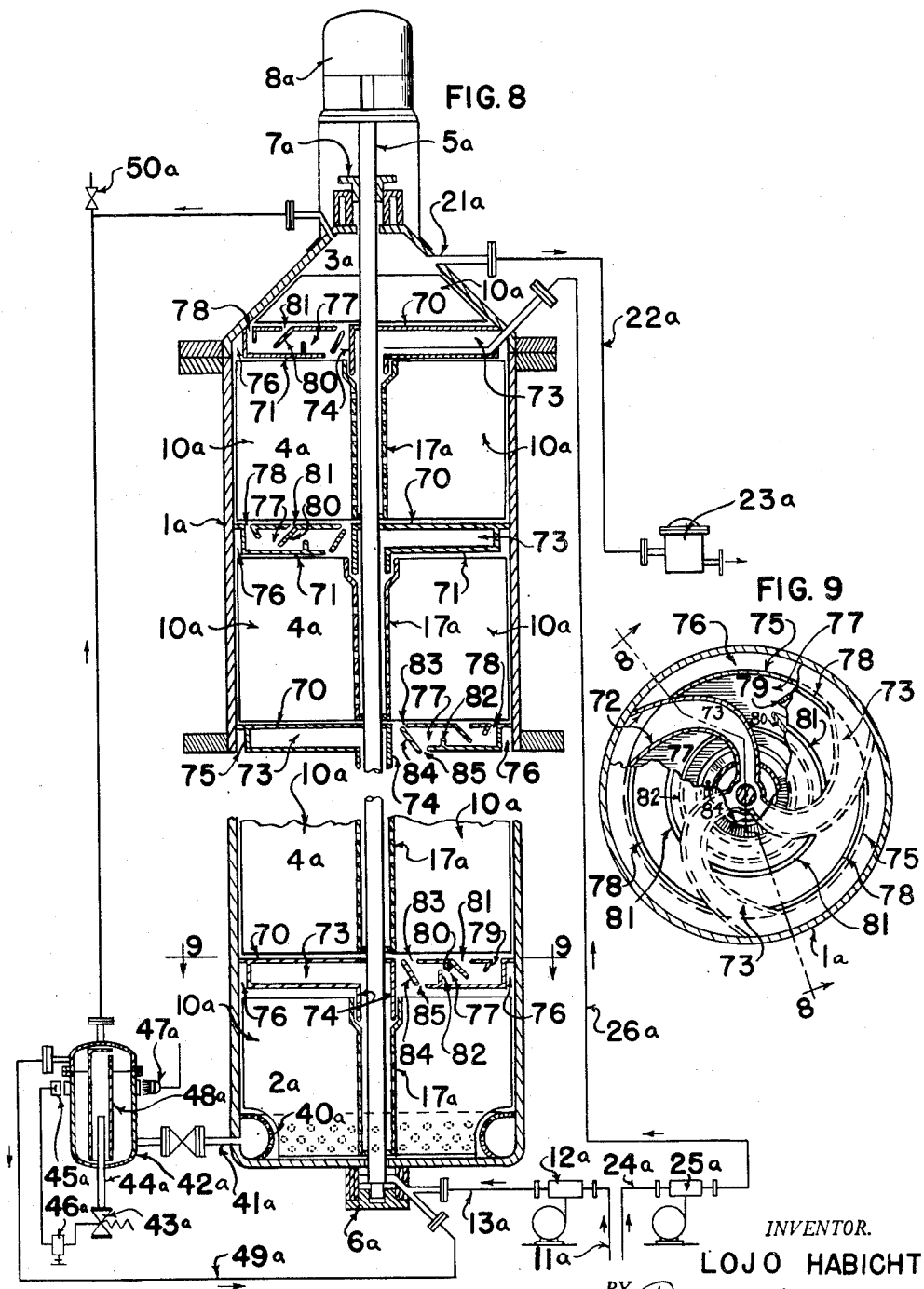

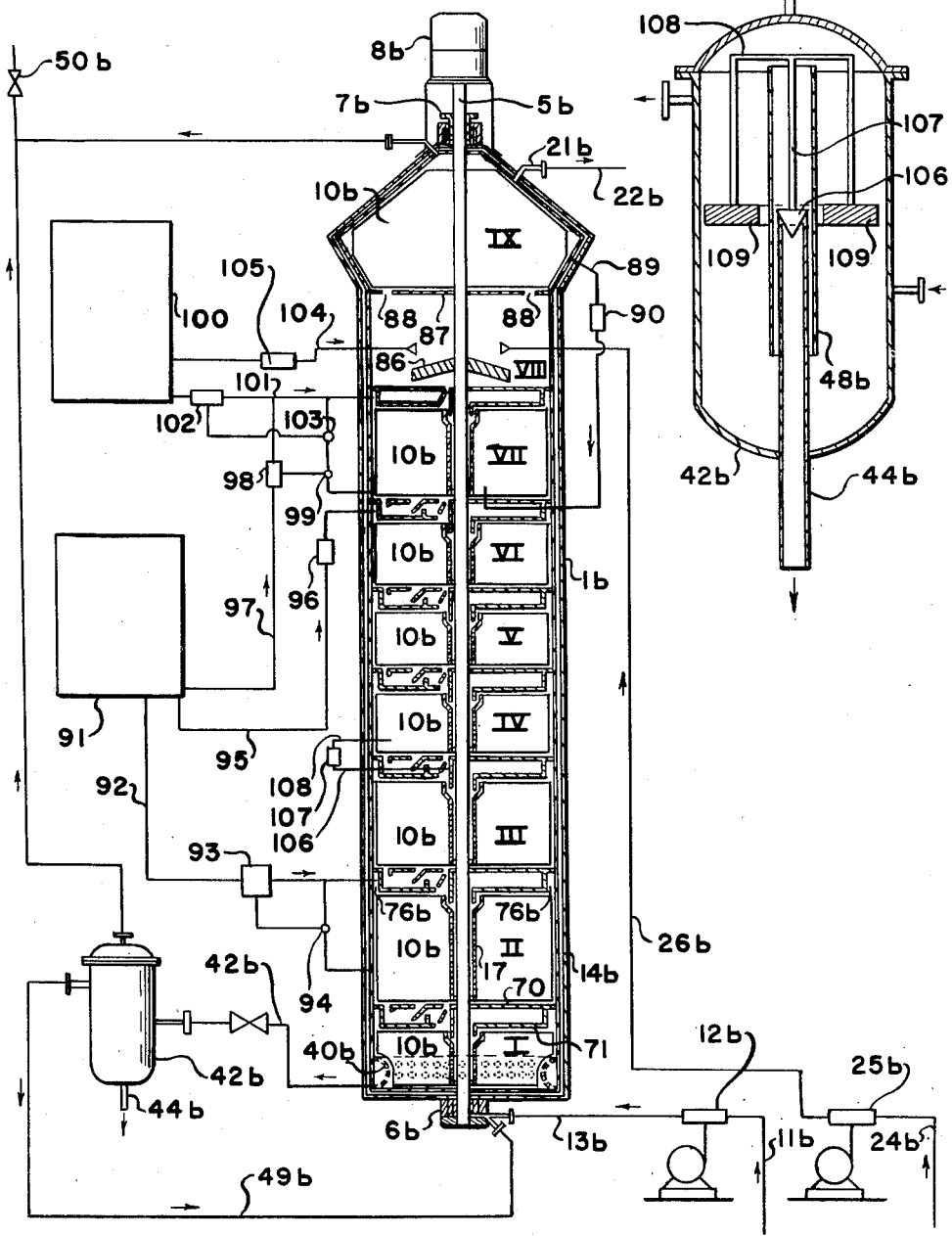
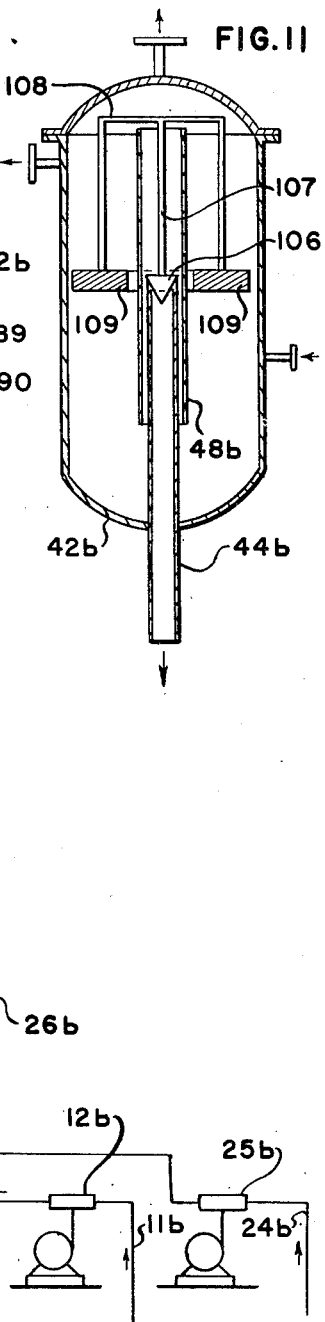
Jan. 1, 1957 — L. HABICHT — 2,776,305
PROCESS FOR CARRYING OUT INTERACTIONS OF LIQUIDS WITH EACH OTHER
Filed April 28, 1950 — 4 Sheets-Sheet 4
FIG. 10
FIG. 11
INVENTOR.
LOJO HABICHT
BY

2,776,305

PROCESS FOR CARRYING OUT INTERACTIONS OF LIQUIDS WITH EACH OTHER

Lojo Habicht, Hamburg, Germany

Application April 28, 1950, Serial No. 158,851

15 Claims. (Cl. 260—415)

The invention relates to a process for effecting continuous interactions between liquids which are either immiscible or incompletely miscible. The process is applicable to the carrying out of purely physical procedures, e. g., solvent extractions and washing of liquids with liquids, as well as chemical procedures such as reactions of any sort between such liquids in which liquid reaction products of different specific weights are formed, e. g., esterification and transesterification (alcoholysis) reactions, hydrolysis of esters, and the like.

In carrying out known processes, pipe systems, towers or columns, and alternately arranged mixing and separating vessels are used through which the two liquids are conducted countercurrent to each other or according to the countercurrent principle by utilization of their difference in specific gravity. In order to obtain better dispersion of the liquids in each other, such devices as roses, nozzles, perforated plates, packings such as Rachig rings, and stirrers have been used. These systems have failed to give satisfactory results either because of low efficiency, due to insufficient mixing of both fluids with each other, or because of limited capacity of throughput since the separation of the liquids depends upon gravity alone. For this reason liquids which tend to form emulsions require apparatus of vast capacity for small throughput, or, where aggravated, may be impossible of treatment; a limitation which seriously restricts the field of application of these systems. These disadvantages are overcome by the present invention.

An essential feature of the new process of the present invention for bringing two immiscible or only partly miscible liquids into continuous interaction with each other comprises uninterruptedly mixing both liquids together and then again separating them from each other by centrifugal action. In carrying out this feature it is best to drive the heavier liquid in a circular path through the lighter liquid by centrifugal force.

Preferably the process is carried out by imparting rotation to both liquids in a suitable chamber to which the heavier liquid is preferably fed from above and the lighter liquid from below. This chamber may best be of cylindrical shape and where required or desired it may be of sufficient strength to withstand high pressure and it may be provided with means to heat or cool it externally. In carrying out the process, the major portion of the heavier liquid, which is driven by centrifugal force into the outer zone of the chamber, is led back again into the lighter liquid in the inner zone of the chamber while the removal of the minor proportion of the heavier liquid is accomplished by paring and is regulated, in accordance with its rate of feed and any volumetric change which takes place in it, by the position of the interface between the liquids. The discharge of the lighter liquid takes place by overflow.

In most cases it is recommended that the process be repeated. The forcing of the heavier through the lighter liquid will then be carried out in a plurality of adjacent or superposed stages with application of the usual countercurrent principle which is common in industry. In this stage-wise repetition, the transfer of the heavier liquid from stage to stage and its final discharge is also accomplished by paring and is regulated by the position of the interface of the liquids while the passage of the lighter liquid from stage to stage proceeds by overflow. The transfer and discharge can, if desired, be regulated by utilizing the different electrical conductivities of the liquids across their interface.

In accordance with the invention, there is achieved a continuous, intimate intermixing and also an uninterruptedly continuing rapid and sharp separation of both liquids within a container by centrifugal force. Preferably this is accomplished by imparting rotation to both liquids within a cylindrical chamber by means of a rotating winged stirring device, whereby a rapid sharp separation of the fluids is effected. The major part of the heavy liquid driven against the outer wall of the chamber is, however, always returned from there by a conduit into the middle of the mass of lighter liquid which fills the inner sector of the chamber and then always driven through it again by centrifugal force. The minor portion of the heavier liquid is continuously discharged at a rate corresponding to the rate of feed and any volumetric change. This discharge is automatically regulated by the position of the interface, preferably by locating a paring device in the region of the interface. The discharge of the lighter liquid takes place at a rate corresponding to its feed and any volumetric change by overflow.

In a plural stage process it is preferable to arrange all chambers vertically one above the other within a closed housing through which a stirring shaft runs.

The utilization of centrifugal force makes possible an uninterrupted sharp and rapid separation and an uninterrupted intimate and rapid intermixing of both liquids whereby the volume of the heavier liquid flowing through the lighter liquid amounts to a multiple of its throughput volume. In this respect the present process effects a significant acceleration over known processes with highest possible efficiency. As a result it is possible, for example, to carry out extractions with a minimum quantity of solvent and particularly to carry equilibrium reactions to completion with a most favorable ratio of reactants. In particular, operations involving liquids which tend to form emulsions can also readily be carried out which heretofore were either impossible or could be carried out only in apparatus of very large dimensions.

A further advantage of the invention is to be seen in the fact that, with automatic regulation of the position of the interface, an extensive control of the particular interaction is made possible through wide variation in the volume and time of flow of the interacting liquids within the various stages of the apparatus. Furthermore the throughput ratio of the interacted liquids passing from the apparatus is independent of the volume ratio of interacting liquids within the apparatus. Finally the invention offers particularly favorable conditions for rapid heat exchange by reason of the rotation of the liquids and the passage of the heavier through the lighter from the interior toward the exterior and back again.

The carrying out of the process is not dependent upon any particular apparatus. A preferred mechanism for carrying out the new process comprises a chamber, optionally a pressure vessel, which is best of cylindrical shape having an axially arranged stirring shaft provided with stirring wings or vanes contoured to the shape of the chamber. The chamber may be provided with heating or cooling devices. The shaft is surrounded by a perforated inlet tube for the heavier liquid. Feed lines for the heavier and lighter liquids are arranged adjacent to the top and bottom, respectively, of the chamber. The chamber is also provided with a reflux line, a paring device and an outlet line for the heavier liquid, which latter is connected with a separating device and a return line for the entrained lighter liquid. Finally the chamber possesses a settling space having an overflow for the lighter liquid.

Preferably a plurality of such chambers are arranged one above the other within a closed cylindrical and optionally pressure resistant body provided with a common central stirring shaft. In such an apparatus the wall separating adjacent chambers preferably includes one or more intermediate feed chambers for the heavier liquid which discharge into the perforated inlet tube of the chamber below and passages through which the lighter liquid flows on its way from a lower chamber into the next higher chamber. Optionally these passages may lead into a conical settling compartment extending into the chamber above to facilitate separation of entrained heavier liquid before the lighter liquid enters the next higher chamber.

Each reflux line for the heavier liquid discharges into a feed chamber which lies above the interaction chamber and which communicates with the perforated inlet tube. Each paring device is connected with a feed chamber which is arranged under the interaction chamber to serve as a separation compartment. This feed chamber is provided with outlet orifices communicating with the interaction chamber (either directly or via a settling chamber) for passage of entrained lighter liquid.

The paring device of the lowermost reaction chamber is connected with a separator from which the discharge of the heavier liquid preferably is controlled automatically according to the interface level and which is connected to the chamber by a reflux line for the entrained lighter liquid.

Since an excellent direct heat exchange results from the rotation of the liquids on the one hand and from the circulation of the heavier through the lighter liquid on the other hand, an external surface heating or cooling jacket suffices for most extractions or reactions in which heat must be added or removed during the operation. With a strongly exothermic or endothermic processes the heavier liquid can also be further heated or cooled in special manner during its reflux circuit.

Whether the process should be operated in one or more stages depends upon the nature of the desired interaction. In many extractions, e. g., those in which the material to be extracted dissolves fully in the solvent or in washings with a cheap solvent such as water where no value is placed upon recovery and which may therefore be used in excess, or in reactions which go to completion easily and quickly, e. g., neutralizations, a plant having a single chamber conforming to the present invention suffices.

In all extraction processes, however, in which solution equilibria of the material to be extracted between both liquids are formed, or where the solvent is to be recovered, a plant having a plurality of chambers is recommended. The number of stages is dependent upon the above mentioned equilibria. A multistage plant lends itself particularly to the carrying out of equilibrium reactions which should be driven as far as possible to completion, such as esterifications, transesterifications, condensations, and the like. As a result of the change in concentration of the reactants from stage to stage, which follows a favorable course for reactions of this type, assisted also by the already mentioned advantage of controllability of volume and throughout time of the liquids, which may be varied from stage to stage and during the operation, as well as the rapid heat exchange within the various stages, such reactions can be extensively controlled during their course and be brought to completion.

The invention may, by way of illustration but not limitation, be used in the following instances:

Separation of sulphonic acids, sulphuric acid esters or their neutralization products from mixtures with unreacted materials such as paraffin hydrocarbons, aromatic or alkyl aromatic hydrocarbons or their oxidation products, fatty oils or fatty acids with solvents.

Separation of neutralization products of sulphonated, sulfo-halogenated of sulphated organic compounds from inorganic salts such as sodium sulphate, sodium chloride and the like with solvents.

Separation of organic acids, particularly fatty acids or their neutralization products from mixtures with unsaponifiable constituents, e. g., oxidation products of hydrocarbons, with solvents.

Refining of fats or oils, particularly separation of free fatty acids by means of solvents or dilute caustic, washing of soaps from fats or oils following caustic refining by means of water or dilute salt solutions, washing and refining of crude fats or oils with acid or water.

Refining of mineral oils of natural or synthetic origin, tar oils or distillates thereof by means of acids, liquid sulphur dioxide or organic solvents.

Extraction of phenols from waste waters of coking operations.

Extraction of acetic anhydride from mixtures with acetic acid, as these come from the production of acetic anhydride, with solvents.

Extraction of phosphatides, sterols or vitamins from fatty oils by means of solvents, fractionation of natural fats, oils or their fatty acids or of synthetic fatty acids into their individual components by selective solvents.

Esterification of organic acids, particularly fatty acids with alcohols or oxyacids or transesterification of such compounds. Hydrolysis of esters, e. g., fatty acid glycerides.

Production of fatty acid amides through the action of ammonia or amines on fatty acids or fatty acid esters.

Sulphonation or sulphation reactions, if desired those carried out with the aid of solvents, in which either the excess sulphonating or sulphating agent, or the unsulphonated or unsulphated organic reactant is separated continuously from the remainder of the reaction mass.

Neutralizations of sulphated or sulphonation products in the presence of a solvent or solvent mixture in which either the unsulphonated or unsulphated organic reactant, or the electrolyte produced in the neutralization of excess sulphonating or sulphating agent is continuously separated with one of the fluid phases.

Saponification of fats and oils with sodium hydroxide, to which sufficient sodium chloride or other suitable electrolyte has been added to produce separation of the soap formed from the glycerine-containing lye.

These examples are only a fraction of the numerous possibilities of interaction between two liquids, or materials which can be put into liquid state, having different specific gravities which can advantageously be carried out by the process of the invention.

The invention will now be further disclosed and explained in conjunction with the drawing in which:

Fig. 1 is a semi-schematic vertical section of apparatus embodying the invention taken along line 1—1 of Fig. 2;

Fig. 2 is a cross section through the apparatus of Fig. 1 along the line 2—2;

Fig. 3 is a section along line 3—3 of the separator in Fig. 1;

Fig. 4 is a fragmentary vertical sectional view of a portion of the apparatus shown in Fig. 1 on a somewhat larger scale;

Fig. 5 is a fragmentary vertical section showing the operation of the paring device and the associated feed chamber;

Figs. 6 and 7 are schematic diagrams of electrical systems for regulating the position of the interface;

Fig. 8 is a semi-schematic vertical section of an apparatus embodying another form of the invention;

Fig. 9 is a cross section through the apparatus of Fig. 8 along the line 9—9;

Fig. 10 is a semi-schematic vertical section of an apparatus embodying a form of the invention particularly adapted for making soap; and Fig. 11 is a vertical section of the auxiliary separator used in the apparatus of Fig. 10.

Referring now to Fig. 1 of the drawing, the apparatus comprises a closed cylindrical, vertical vessel 1 having a bottom chamber 2, a top chamber 3, and a plurality of similarly constructed intermediate chambers 4. A shaft 5 runs axially through the chambers and is journaled in the end walls of vessel 1 in suitable bearings 6 and 7, the former being adapted to bear the thrust and both being so constructed as to resist leakage of liquids under the operating pressure. Shaft 5 is driven by a motor 8 through a speed control device 9 of any suitable type. Mounted on shaft 5 for rotation therewith in each of chambers 2 and 4 are four wings or vanes 10 which are shaped to conform closely to the interior of the chamber in which they rotate with only slight clearance in order to effect substantially nonturbulent rotation of liquids.

The lighter liquid flows through line 11 from a supply (not shown) to proportionating pump 12 which forces it through line 13 into the bottom chamber 2 adjacent to the lower end of shaft 5. Chamber 2 is provided with a jacket 14 having an inlet 15 and an outlet 16 for heating or cooling fluid. In chamber 2 the liquid is set in rotation but due to its lesser mass it remains only in the inner zone of the chamber. The lighter liquid is then traversed by streams of the heavier liquid entering through perforations in the inlet tube 17. The heavier liquid is driven by centrifugal force to the outer zone of the chamber. As pump 12 continues to operate the lighter liquid flows through a plurality of orifices 18 located in the top wall of the chamber and into a conically shaped settling compartment 19, as shown in Figs. 2 and 5. In this compartment entrained globules of heavier liquid settle out and flow back toward chamber 2. The lighter fluid then overflows the upper end of the conical wall of compartment 19 into a space of annular cross section under a conical hood 20 which conducts it to the bottom of chamber 4. It then rises in the various sectors between vanes 10 which set it in rotation as described for chamber 2. In like manner it flows upwardly through each of the plurality of chambers 4 until it reaches the conical settling compartment 19 of chamber 3 which is provided with an overflow outlet 21. The outlet 21 is connected to a discharge line 22 having a float valve 23 to control flow of the lighter liquid from the system.

The heavier liquid flows through line 24 from a supply (not shown) to proportionating pump 25 which impels it through line 26 into the upper chamber 4 by way of one or more segmental feed chambers 27 formed in the partition wall between chamber 3 and the uppermost chamber 4. Two such feed chambers are shown by way of illustration in the drawing, but any desired number may be used. Each feed chamber communicates with the perforated tube 17. Upon entering the chamber 4 through these perforations, the heavier liquid streamlets or particles flow through the inner zone of lighter liquid, due to the centrifugal acceleration imparted to it, toward the outer zone of the chamber where it builds up as a somewhat hollow cylindrical mass, as shown schematically in Figs. 5, 6 and 7 where the heavier liquid is shown by the heavier dashed lines and the lighter liquid by the lighter dashed lines. The major portion of the heavier liquid is then refluxed by the momentum imparted to it through one or more reflux lines 28 which communicate with chamber 4 near the bottom and discharge into the segmental feed chambers 27 from which the recycling heavier liquid flows again through the perforated tube 17 into the lighter liquid and begins anew the described cycle of flow. The minor portion of the heavier liquid, for the purpose of further conduction toward the next lower chamber 4, is taken up by one or more paring devices 30 and run through one or more pipes 31 connected therewith into one or more segmental settling chambers 29 in the partition wall between the chambers 4, from the settling chamber 29 into the perforated tube 17 of this chamber, and into the inner zone of lighter fluid therein.

The paring devices 30 also serve automatically to regulate the interface of both liquids in each chamber in that at high position of the heavier liquid more is taken out then at low position. The operation is shown best in Fig. 5 where the interface occupies an intermediate position so that approximately equal amounts of each liquid are taken from the chamber. Any of the lighter liquid, which is simultaneously taken up by the paring devices 30, separates when it reaches the settling chambers 29, rises to the top and returns to the chamber 4 through openings 32 and settling compartment 19. In this manner the overflow of the heavier liquid takes place from chamber to chamber until it reaches chamber 2.

The structure of the partition between the chambers will be understood best from Figs. 1, 2 and 4. Upper and lower walls 33 and 34 extending from shaft 5 to casing 1 are spaced from each other to provide the feed chambers 27 and the settling chambers 29. The only direct connection between chambers 4 above and below the partition is by way of the passages 18 which are in the form of short tubes secured to or integral with the spaced upper and lower walls and of which six are shown in Fig. 2. To the top wall 33 is secured a short tube 35 which has an internal diameter somewhat larger than the diameter of shaft 5. A tube 36 of the same diameter is secured to the bottom wall, spaced somewhat from 35 to provide a discharge outlet from both chambers 27 and 29, and extending some distance below the bottom wall into an enlargement 17b at the upper end of the perforated tube 17. The external diameter of 36 is only slightly less than the internal diameter of 17b so that practically no liquid can pass between them while still permitting substantially frictionless relative motion.

Extending outwardly from 35 and 36 are partition walls 37 which separate two oppositely located feed chambers 27 from two oppositely located settling chambers 29 (Fig. 2). Within each chamber 29 is a downwardly extending baffle 38 on the top wall and an upwardly extending baffle 39 on the bottom wall located between 35 and 38. It will be seen in Fig. 5 that the mixture of liquids entering settling chamber 29 separates by gravity and most of the lighter liquid rises through the two openings 32 into the chamber 19. The heavier liquid passes under baffle 38, over baffle 39 and out of the opening between 35 and 36 on its way to the perforated tube 17, and any lighter liquid which is entrained can flow upwardly through the opening 32 above baffle 39 into chamber 19.

The discharge of the heavier liquid from chamber 2 is effected through a paring device 40, which is advantageously located adjacent to the bottom of the chamber 2 and preferably is constructed in the shape of a perforated hollow toroid, and a discharge line 41 communicating with a separator 42. The final discharge of the heavier liquid from the system takes place from the separator 42. The paring device 40 serves to regulate the interface between the two liquids in chamber 2.

The interface level in separator 42 is regulated by the solenoid operated valve 43, which is located in heavy liquid discharge line 44. Valve 43 is operated by photocell 45 and relay 46. When the interface of the liquids falls to the level of photocell 45 and modifies the amount of light from the source 47 entering the cell, the relay 46 operates to close valve 43 and stop or throttle the flow of heavy liquid from the vessel 42 until the interface rises again. The discharge line 44 extends upwardly in the vessel 42 into the interior of a larger pipe 48, which is located at one side of the vessel so as not to interfere with the light beam and whose lower end is near the bottom of the vessel so as to provide that only heavy liquid enters through it into discharge line 44. The lighter liquid separated from the heavier in vessel 42 is returned by reflux line 49 to the chamber 2.

In cases where the specific gravities of liquids treated in such apparatus are fairly constant and not too close to each other the discharge of heavy liquid from the separator can most simply be controlled by a floating valve—the swimming body swimming upon the interface of both liquids. (This case is not shown in the drawing.)

In starting up the apparatus, heavier liquid is pumped through line 26 into the uppermost chamber 4 while air is exhausted from the system through vent valve 50. It fills this chamber to the height of the separating compartment 19 and then overflows into the next lower chamber 4, etc., until it reaches chamber 2. As the heavier liquid rises in chamber 2 it attains a height sufficient to flow through line 41 into separator 42 where the level rises to the predetermined position for operation of valve 43.

At this point the feed of heavier liquid is stopped and the valve in line 41 is closed. The motor 8 is then started to rotate shaft 5 and lighter liquid introduced as described into chamber 2 until its egress from overflow 21 indicates that the apparatus is full. After restarting the feed of heavier liquid and reopening the valve in line 41, the apparatus is in continuous operation.

The dimensions of the settling compartments 19 through which the heavier liquid overflows into the next lower chamber when the vanes 10 stand still and the position of separator 42 are advantageously so chosen that the amount of heavier liquid initially introduced into the system in the manner described corresponds approximately with the desired operating volume thereof. This has the further advantage that should the rotation of shaft 5 stop for any reason during the continuous operation of the apparatus, no essential change in volume of the liquids could occur.

The regulation of the position of the interface between the two liquids during operation can be accomplished in ways other than the one described. The discharge of heavy liquid from a chamber may, for example, be controlled electrically by regulating the opening in valves, speed of pumps, etc., in response to the position of the interface. Illustrative types of such electrical control systems are schematically illustrated in Figs. 6 and 7 which are applicable where the electrical conductivities of the heavier and lighter liquids are different but fairly constant.

In Fig. 6 one interaction chamber is fragmentarily shown with the heavier liquid, represented by heavier dash lines, occupying the outer zone and the lighter liquid, represented by the lighter dash lines, occupying the inner zone. At the bottom of the chamber is an outlet line 51, which may correspond either to lines 31 of chambers 4 or line 41 of chamber 2, having a valve 52. The closure element of valve 52 is operatively connected with a solenoid 53 in a circuit which includes a source of electric current, shown conventionally by transformer 54, and an electrically controlled switch 55. The opening and closing of switch 55 is controlled by a relay 56 in a circuit which includes a source of electric current, shown conventionally by transformer 57, and two spaced electrodes 58 and 59. Electrode 58 is the casing wall 1 in this case but it may be a separate electrode insulated from the casing, if desired. Electrode 59 is located somewhat inwardly of the predetermined desired position of the interface and it is insulated from the casing by insulator 60. Relay 56 is so adjusted that a slight change in the strength of the current flowing from source 57, due to deviation of the interface from the desired position, will operate valve 52 in such a way as to restore the interface to the desired position.

Assuming that the heavier liquid has the higher conductivity, the strength of the current flowing from source 57 will increase as the interface moves toward electrode 59 until it exceeds the amperage representing the desired interface position whereupon relay 56 will operate switch 55 to open valve 52 and permit heavier liquid to discharge through line 51 at a sufficient rate to restore the interface to the desired position. As the position of the interface moves away from electrode 59, the strength of the current flowing from source 57 will diminish until it falls below the amperage representing the desired interface position whereupon relay 56 will operate switch 55 to close or throttle valve 52 and permit the heavier liquid to build up again in the chamber.

In case the ligher liquid has the higher conductivity, the relay 56 must open the valve 52 when the current from source 57 falls below the amperage representing the desired interface position, and vice versa.

Fig. 7 shows one chamber 4 fragmentarily with outlet line 51, valve 52, solenoid 53, electrodes 58 and 59 (vane 10 being notched to clear the latter) and insulator 60 all as shown in Fig. 6, but with a different electrical system for controlling operation of valve 52. Reference numeral 61 represents a source of direct current across which is a voltage divider or potentiometer 62. The electrode 58 is connected to the negative end of potentiometer 62. The leads from the solenoid 53 are connected, respectively, to the positive end of potentiometer 62 and to the plate 63 of a triode 64. Electrode 59 is connected to the grid 65 of triode 64 while the heated filament 66 thereof is connected to the variable potentiometer lead 67. The magnetic force of solenoid 53 tending to move the closure element of valve 52 is counterbalanced by a mechanical force, e. g., a spring 68, which forces are always in equilibrium.

Assuming the heavier liquid to have higher conductivity than the lighter liquid, the magnetic force of solenoid 53 is arranged to open valve 52 so that as the interface moves toward electrode 59 and more current flows in the electrode circuit, there is a corresponding increased current flow in the solenoid circuit which opens valve 52 and permits the heavier liquid to discharge through line 51 at a greater rate. As the interface recedes from electrode 59 less current flows in the electrode circuit and in the solenoid circuit, thus permitting the spring 68 to close valve 52 and diminish the rate of discharge of the heavier liquid. The predetermined position of the interface can be regulated by moving the lead 67 along the potentiometer.

If the lighter liquid has higher conductivity than the heavier liquid, the system is simply altered so that the mechanical force tends to open and the magnetic force tends to close the valve 52.

In the control systems of Figs. 6 and 7 there is practically no lighter liquid withdrawn through line 51, thus differing in this respect from withdrawal of liquids by a paring device 30 into line 31, as shown in Fig. 5. For this reason the openings 32 and baffles 38 and 39 can be dispensed with and it is not necessary to use the partitions 37 to separate the feed and settling chambers 27 and 29 where a control system is employed which operates in the manner of Figs. 6 and 7.

The apparatus illustrated in Figs. 8 and 9 is somewhat simpler in construction than that of Figs. 1 and 2 and can be used with advantage where the reflux lines do not need to be used for heat exchange and/or regulation at intermediate stages. It comprises a closed cylindrical vertical vessel 1a having a bottom chamber 2a, a top chamber 3a and a plurality of similarly constructed intermediate chambers 4a. A shaft 5a runs axially through the chambers and is journaled in the end walls of vessel 1 in suitable bearings 6a and 7a, as already described for the corresponding parts of the apparatus of Fig. 1. Other parts which correspond with those of Fig. 1 bear the same reference numbers plus the letter *a* and need not be further described.

The partition between adjacent chambers in the apparatus of Fig. 8 has a different construction from that between the chambers of the apparatus of Fig. 1 and it serves to recycle heavier liquid within a chamber, as a paring device for controlling the interface, and to pass heavier liquid downwardly and lighter liquid upwardly from chamber to chamber. Structurally it comprises a top plate 70 extending from the casing 1*a* to the shaft 5*a* which rotates in it with a minimum of clearance necessary for frictionless rotation, a bottom plate 71 which is spaced from both the casing 1*a* and the shaft 5*a*, and a plurality of curved vertical walls connecting the top and bottom plates. Certain of these designated 72 form recycle or reflux channels 73 (Fig. 9) which are adapted to pick up heavier liquid at the periphery of a chamber due to its rotary motion (clockwise in Fig. 9) and conduct it into a tube 74 which communicates with perforated tube 17*a* in the same manner that 36 communicates with 17. Other vertical walls designated 75 of arcuate shape connect the periphery of bottom plate 71 between channels 73 with the top plate 70, forming open bottom feed conduits 76 which empty into channels 73 on the outside thereof and settling chambers 77 on the inside thereof.

An arcuate paring slot 78 is provided in the top plate for each settling chamber 77 at the desired position of the interface. A mixture of the lighter and heavier liquids passes from the chamber above through paring slots 78 into the settling chamber 77 in the same way already described for paring device 30. Here it passes under a baffle 79 along the edge of slot 78, under a baffle 80 along the edge of a second arcuate slot 81 and over a baffle 82 on the bottom plate 71. A third arcuate slot 83 is formed in the top plate above the settling chambers near a conical arcuate wall 84 and a similar slot 85 is formed in the bottom plate 71. The baffle 79 largely prevents lighter fluid which separates in chamber 77 from flowing back into chamber 4*a* through paring slot 78 and thus directs most of it, with the aid of baffle 80, through slot 81. Additional lighter liquid which separates returns through slot 83. The heavier liquid is held back to some extent by baffle 82 to assure a settling time, that which flows over it passing downwardly through slot 85 into the chamber below where centrifugal force throws it outwardly. The lighter liquid flows from a lower chamber into a higher chamber through the passages between tube 74 and conical walls 84. It will be noted that the perforations in tube 17*a* terminate some distance below plate 71 which practically assures removal of heavier liquid entering through the perforations before the lighter liquid enters these passages.

Chamber 3*a* also is provided with vanes 10*a* to assure separation of any entrained heavier liquid before the lighter liquid overflows into outlet 21*a*. By reasons of the sloping top wall of casing 1*a*, all segregated heavier liquid leaves chamber 3*a* through slots 78 without building up a rotating mass.

In starting up the operation in the apparatus of Figs. 8 and 9 the valve in line 41*a* is closed and lighter liquid is fed in until the lower part, e. g., the lowermost chamber, is filled. Heavier liquid is then pumped in through line 26*a*, preferably at a higher rate than desired for final continuous operation while lighter liquid continues to be fed through line 13*a* and motor 8*a* is started. As soon as heavier liquid reaches the lowermost chamber, the valve in line 41*a* is opened. When the lighter liquid begins to discharge through line 21*a* the rates of feed of lighter and heavier liquids are adjusted to the desired ratio. The final regulation of the interface position in the various chambers takes place automatically.

The following working examples are given for the purpose of illustrating but not limiting the invention:

*Example I*

Using the apparatus of Fig. 1 in the manner previously described, an overhead vacuum-distilled lubricant stock at a temperature within the range of about 100° to 250° F. is pumped through line 13 into the bottom of the vessel 1 and furfural at about the same temperature is pumped through line 26 into the uppermost chamber 4. The proportionating pumps 12 and 25 are set to deliver about twice as much by weight of furfural per unit time as hydrocarbon (solvent ratio about 2:1). The light raffinate is removed from the top via line 22 to a raffinate stripper and the heavier extract phase, after separation from entrained lighter liquid in separator 42 is removed by way of line 44 to an extract stripper. The solvent recovered from both strippers is returned to a storage vessel connected with line 24. The refined oil from the raffinate stripper is of excellent quality indicating very thorough separation.

*Example II*

Using the apparatus of Fig. 8 in the manner previously described, except that pressure release valves are provided in lines 22*a* and 44*a*, liquid propane is pumped into vessel 1*a* through line 13*a* while a heavy asphaltic crude residuum is pumped into the uppermost chamber 4*a* through line 26*a*. The proportionating pumps 12*a* and 25*a* are set to deliver about five times as much by weight of liquid propane per unit time as hydrocarbon (solvent ratio 5:1). The temperature of the liquids is within the range of about 80° to 100° F. The lighter extract phase is removed from the top of the tower and run to propane evaporators and a stripper of conventional types, the recovered propane being returned to a storage vessel connected with line 11*a*. The heavier raffinate phase removed through line 44*a* passes to a furnace, to a flash drum and finally to a stripper all of conventional type, the recovered propane being returned to said storage vessel. The oil recovered from the extract phase is satisfactorily de-asphalted.

*Example III*

Using the apparatus of Fig. 1 in the manner already described except that air or inert gas under suitable pressure is supplied through valve 50 and pressure release valves are used in lines 22 and 44, liquid fat is pumped into chamber 2 at a tempature of about 40° to 100° C. while unheated water is pumped into the uppermost chamber 4. The proportionating pumps 12 and 25 are set to deliver about half as much water by weight per unit time as fat (solvent ratio about 1:2). The reflux lines 28 for the bottom chamber 4 and the next to the top chamber 4 pass through Dowtherm heat exchangers which raise the temperature of the liquids in these intermediate reaction chambers within the range of 200° to 270° C. The rates of flow are controlled so that the fat to be hydrolyzed is at the hydrolyzing temperature for about 30 to 120 minutes. The end chambers serve as direct heat exchangers for cooling the outgoing sweet water and fatty acids and preheating the incoming fat and water, thus making the heat efficiency of the system very high. Free fatty acids are removed through line 22 with a low dissolved water content because of the effective heat exchange with the incoming water and the efficiency of separation of heavier from lighter liquid. Sweet water of relatively high glycerine content is removed through line 44. The pressure of the air or inert gas supplied through valve 50 is at least equal to and preferably somewhat higher than the pressure of saturated steam at the highest temperature in the system so as to provide smooth operation and to assure retention of water in liquid phase.

In carrying out the hydrolysis of fat in the manner described, it is advantageous to provide about three times more volume in the lowermost reaction chamber, i. e., the lowest chamber 4, than in succeeding reaction chambers. In this way the hydrolysis reaction can be carried to about 60% to 75% of completion in the first reaction chamber 4 which has a number of advantages. One is that up to this degree of hydrolysis the rate of reaction is substantially independent of the concentration of glycerol in the aqueous phase. This makes it possible to operate the system to yield a fairly concentrated sweet water without adversely affecting the throughput rate or the final degree of hydrolysis. A second advantage depends upon the fact that at this degree of hydrolysis the solubility of water in the fatty phase has substantially reached its maximum. The fresh oil entering this chamber is therefore dissolved in a fatty phase of high water content under optimum conditions for very rapid reaction. The slow starting rate of hydrolysis due to low solubility of water in the fresh oil is thereby avoided.

*Example IV*

Using the apparatus of Fig. 8, except that it is completely jacketed to provide uniform temperature throughout, liquid fat, e. g., a tallow-coconut oil blend, is pumped into chamber 2a while an aqueous brine and caustic soda solution, or a separate solution of each, is pumped into the uppermost chamber 4a at a rate so proportioned with respect to the fat feed rate as to provide two liquid phases and a slight stoichiometric excess of caustic. While the concentration of caustic and brine may vary over a wide range, a solution containing 5% to 10% caustic as $Na_2O$ and 8 to 12% NaCl is satisfactory. The temperature of the reacting liquids is maintained at about 100° C. Liquid neat soap is removed through line 22a and the spent lye containing liberated glycerine is removed through line 44a.

It is advantageous to be able to carry out the necessary washing, fitting and settling operations within the same piece of apparatus and this can be accomplished by providing additional stages as disclosed in Fig. 10. The apparatus of Fig. 10 being generally the same as that of Fig. 8, all parts which are the same in both embodiments have been given the same reference numerals in Fig. 10 as in Fig. 8 except that they bear postscript *b* and no further description of the structure of these parts need be given. It will be observed that the entire vessel 1b is jacketed at 14b to provide temperature control. Nine interaction chambers designated I to IX, going upwardly, are provided for carrying out the following operations:

| Chamber or Stage | Operations |
| --- | --- |
| I | Neutralization of lye. |
| II | Main saponification. |
| III | Killing. |
| IV | First Washing. |
| V | Second Washing. |
| VI | Third Washing. |
| VII | Fourth Washing. |
| VIII | Finishing. |
| IX | Settling (Separation of nigre from neat soap). |

Chambers I through VI have the same construction as chambers 2a and 4a of Fig. 8. Chamber VII is the same except that the partition between it and chamber VIII has only reflux lines and passages near the shaft for flow of lighter liquid from VII into VIII similar to the passages between 74 and 84 in the other partitions. Chamber VIII, instead of having vanes 10b secured to a perforated tube 17 as in chambers I to VII, is provided with an efficient mixing device 86, e. g., a turbo-mixer. A simple partition 87 provided with a plurality of orifices 88 separates chambers VIII and IX.

Chamber IX is provided with vanes 10b for rotating the liquids therein so as to effect centrifugal separation of the liquid neat soap from the liquid nigre. The chamber wall preferably diverges from both ends to assure a layer of nigre of considerable thickness despite the relatively smaller volume thereof compared to the neat soap and to provide for removal of neat soap through outlet 21b and nigre through outlet 89 which communicate with chamber IX on opposite sides of the interface between these phases. The orifices 88 preferably are located near the interface. A proportioning pump 90 in nigre outlet line 89 returns the nigre to the bottom of chamber VII at a controlled rate. If desired, the nigre can be drawn off for treatment or use outside the tower.

A caustic tank 91 has a feed line 92 communicating with reflux conduit 76b of the partition above chamber II. Flow of caustic solution through line 92 is regulated by a feed regulator 93 under the control of an automatic device 94 which preferably continuously samples the aqueous phase in the outer layer of chamber II. A second caustic feed line 95 provided with a proportionating pump 96 supplies caustic to the reflux conduit 76b of the partition above chamber VI. A third caustic feed line 97 provided with a feed regulator 98 supplies caustic to the reflux conduit 76b in the partition above chamber VII, this flow being controlled by an automatic device 99 which preferably continuously samples the aqueous phase in chamber VII.

A brine tank 100 has a feed line 101 communicating with the reflux conduit 76b in the partition above chamber VII, the flow of brine being controlled by a feed regulator 102 under control of an automatic device 103 in the same sampling line as control 99. A second brine feed line 104 supplies brine to chamber VIII by means of a proportionating pump 105.

The fatty material to be saponified is brought through supply line 11b and fed into chamber I through line 13b by pump 12b. Water is introduced into chamber VIII through line 26b by pump 25b. Spent lye leaves chamber I through paring device 40b and discharge line 42b where it is discharged into separator 42b. As seen in Fig. 11, the outlet line 44b is provided at the upper end with a valve 106 which is connected by stem 107 with the cross bar 108 of an annular float 109 which is adapted to float at the interface between a fatty phase and an aqueous phase which separate by gravity in separator 42b. It will be apparent that if the level of the lower spent lye phase rises, the floats will open the valve to permit the spent lye to flow out through line 44b but that the flow will cease when the level falls near the upper end thereof. Fatty material is returned through line 49b to chamber I.

The lowermost chamber I in which the fatty material is introduced at any suitable temperature above the melting point serves for neutralizing the lye coming from the chambers above. During this process any free fatty acids of the fat composition introduced through line 13b are used up and a partial saponification of neutral fat takes place. The degree of saponification obtained in this chamber may range between 10 to 20%. In chamber II the main part of the saponification takes place by interacting the fatty phase with a lye of not too high a proportion of $Na_2O$, e. g., about 2% to 4%, which can be neutralized within the first stage. The proper concentration of $Na_2O$ within the aqueous phase is kept constant by regulated feed of the small additional amount of caustic necessary for saponification in this stage through line 92. The main amount of alkali comes from the stages above. This chamber, in which a degree of saponification between 75 and 90% may be obtained, is therefore preferably of larger size than the other chambers. Control device 94 may be a pH meter for making continuous determination of the alkali by pH measurement of a mixture of a continuously withdrawn sample with a suitable buffer solution. The electromotive force generated in the electrodes of the meter can then be utilized to control the feed regulator 94 which may be of any suitable design, such as a variable speed feed pump, diaphragm valve, etc.

Saponification will go practically to completion in the next higher chamber III where the fatty material contacts an aqueous phase which may contain about 6% to 9% $Na_2O$. The degree of completion of the saponification can be checked, e. g., by withdrawing a sample of soap either continuously or intermittently through line 106 and mixing it with distilled water to form a solution which can be tested for turbidity by mere observation or by means of a photo-electric cell. Such a measuring instrument is indicated at 107, with the testing solution being returned to the system through line 108. By proper calibration of the instrument or by comparison of the test solution with standardized solutions the operator can ascertain whether the reaction has proceeded to a satisfactory degree of completion. If it has gone further than required, the rate of feed of the reactants may be increased, if desired, whereas if it has not gone far enough the rate of feed of the reactants should be diminished.

Any slight residue of unsaponified material in the liquid which flows from chamber III into IV is saponified in the next washing stages in chamber IV to VI where contents of $Na_2O$ rise to about 8 to 10% due to the fact that practically no consumption of $Na_2O$ takes place in these stages. The main quantity of caustic is introduced into chamber VI through line 95 in a continuous constant proportion by the proportionating pump 96.

In the uppermost washing stage in chamber VII the amount of brine necessary for separating soap from spent lye in the earlier or saponification stages is brought into the system. If this is the last stage carried out in the apparatus, e. g., if the soap which is now in a condition to be fitted is removed from the apparatus and treated in a kettle in the usual way for fitting and settling, the brine is introduced by a proportionating pump. On the other hand if the fitting and separating stages are carried out in succeeding stages in a continuous manner within the same closed vessel, as is preferred, a regulation of the concentration of $Na_2O$ and $NaCl$ within the aqueous solution of the uppermost washing stage is necessary in order to impart to the soap which enters the fitting chamber VIII such amounts of both electrolytes that after mixing with constant amounts of water and/or additional brine, conditions will be obtained providing the desired ratio of appropriate neat soap and nigre in the final separating stage in chamber IX.

Regulation of concentration of $Na_2O$ within the uppermost washing stage in chamber VII can be accomplished in a similar way as it is done in the second saponifying stage in chamber II by controlled feed of slight additional amount of caustic through line 97 and feed regulator 98 under control of a pH meter 99. Regulation of the concentration of sodium chloride may be accomplished by control 103 either by checking electrical conductivity or the chlorine potential of the aqueous phase and governing hereby feed of brine through line 101 by feed regulator 102.

The soap thus being adjusted in an indirect manner enters the fitting chamber VIII where it is mixed continuously with constant amounts of water introduced through line 26b by pump 25b and additional brine introduced through line 104 by pump 105.

From this fitting stage the soap passes continuously to the separating chamber IX where the soap is subjected to centrifugal force as described, and separated thereby into neat soap and nigre. In order to facilitate separation, the finished soap preferably enters the separating chamber through orifice 88 at a distance from the shaft near the interface between neat soap and nigre. The nigre which is drawn off continuously from the outside of the chamber through line 89 is fed back into a washing stage. The nigre may be introduced into chamber VI if it contains a relatively large amount of impurities, but in general it is preferably introduced into chamber VII as shown in Fig. 10 for better utilization of the countercurrent principle.

It will be understood that all of the proportionating pumps used in this system, i. e., pumps 12b, 25b, 90, 96 and 105, will be interconnected so that the flow rate of the incoming fat can be increased or decreased without disturbing the proportional rates of flow of the other materials. Each pump will also be separately adjustable so as to enable proper setting of its rate of feed or flow independently of a change in the rate of the other pumps.

The described process of executing the saponifying, purifying, fitting and separating operations within one apparatus has not only the advantage of technical simplicity and economy but also the advantage that the caustic solution necessary for saponifying the fat can be used for the washing operations as well, thus providing a minimum bulk of lye (i. e., a low ratio of spent lye to fat), highest recovery of the glycerin and highest glycerin concentration of the spent lye.

The apparatus described and illustrated in the present patent forms the subject matter of my co-pending application S. N. 324,579 filed December 6, 1952.

Although the invention has been described and illustrated in conjunction with certain specific embodiments, it will be understood that it is capable of broad application and that variations and modifications of structure and operating procedures may be made without departing from the spirit and scope of the invention as set forth in the appended claims.

What is claimed is:

1. The process of interacting two liquids of different specific gravities which at most are only partially miscible which comprises rapidly rotating a mass containing both liquids around a vertical axis in an annular chamber filled therewith whereby the mass is in the form of a somewhat cylindrical body with the heavier liquid filling an outer zone and the lighter liquid filling an inner zone thereof, there being a somewhat cylindrical interface between said heavier and lighter liquids, introducing heavier liquid into the inner cylindrical surface of said liquid body at a plurality of locations so that it passes in dispersed form through the body of lighter liquid into the body of heavier liquid by centrifugal force, withdrawing a mixture of heavier and lighter liquid from the body across said interface, the rate of withdrawal of the heavier liquid in said mixture corresponding to said rate of introduction of heavier liquid, separating said mixture into heavier and lighter liquds, returnng said separated lighter liquid to said rotating mass, introducing lighter liquid into said liquid body adjacent to the bottom thereof, withdrawing lighter liquid from the top of the body thereof in said inner zone, withdrawing a stream of heavier liquid from the outer zone and reintroducing it into said mass at a plurality of locations on the inner cylindrical surface of the lighter liquid so that it passes in dispersed form through the lighter liquid in the inner zone into the heavier liquid in the outer zone by centrifugal force.

2. The process of interacting two liquids of different specific gravities which at most are only partially miscible which comprises rapidly rotating a mass containing both liquids around a vertical axis in an annular chamber filled therewith whereby the mass is in the form of a somewhat cylindrical body with the heavier liquid filling an outer zone and the lighter liquid filling an inner zone thereof with a somewhat cylindrical interface between the two liquids in said body, introducing lighter liquid into said liquid body adjacent to the bottom thereof, withdrawing lighter liquid from the top thereof inside said interface, introducing heavier liquid into said liquid body, withdrawing a mixture of heavier and lighter liquid from the body across the interface, separating said mixture, returning the separated lighter liquid to said body, withdrawing heavier liquid from the body outside said interface for recycling and reintroducing it into said mass at a plurality of locations on the inner cylindrical surface of the lighter liquid so that it passes in dispersed form through the lighter liquid in the inner zone into the heavier liquid in the outer zone by centrifugal force.

3. The process as set forth in claim 2 in which the position of the interface between the two liquids in the rotating mass is controlled by the ratio of heavier and lighter liquids in the mixture withdrawn from said body across the interface.

4. The process for interacting two liquids of different specific gravities which at most are only partially miscible which comprises rotating a plurality of masses containing both liquids around a single vertical axis in a plurality of vertically related annular chambers filled therewith whereby each mass is in the form of a somewhat cylindrical body with the heavier liquid filling an outer zone and the lighter liquid filling an inner zone thereof with a somewhat cylindrical interface between the two liquids in said body, introducing lighter liquid into the lowermost body, withdrawing lighter liquid from each body inside said interface and passing the withdrawn lighter liquid from each body except the uppermost into the next higher body, introducing heavier liquid into the uppermost body, withdrawing a mixture of heavier and lighter liquids from each of said bodies across said interface, separating each mixture, reintroducing the separated lighter liquid into the same body from which it was withdrawn, passing the separated heavier liquid from each body except the lowermost to the next lower body, withdrawing heavier liquid from each body outside the interface and recycling it to the inner cylindrical surface of the same body through a plurality of locations so that heavier liquid recycles repeatedly in dispersed form through each body of lighter liquid into each body of heavier liquid by centrifugal force.

5. The process of refining a petroleum fraction such as lubricating oil fraction which comprises rapidly rotating a mass comprising such fraction and a suitable solvent being heavier than this fraction at a suitable temperature around a vertical axis in an annular chamber, whereby the mass is in the form of a somewhat cylindrical body with the solvent filling an outer zone and the petroleum fraction an inner zone therein with a somewhat cylindrical interface between them, introducing the petroleum fraction to be extracted into said mass adjacent to the bottom thereof, withdrawing extracted petroleum fraction inside said interface at the top thereof, withdrawing for recycling a stream of solvent outside said interface and reintroducing it at a plurality of locations into the inner cylindrical surface of the petroleum fraction in the inner zone, introducing fresh solvent into the system, withdrawing a mixture of solvent and petroleum fraction across the interface, separating the mixture and returning the separated petroleum fraction to the rotating mass.

6. The process as set forth in claim 5 in which the process is carried out in a plurality of like stages in accordance with continuous counter current principles with the petroleum fraction entering the lowermost stage and the solvent the uppermost stage.

7. The process of refining a petroleum fraction which comprises rotating a mass comprising such fraction and a suitable solvent lighter than this fraction at a suitable temperature around a vertical axis in an annular chamber, whereby the mass is in the form of a somewhat cylindrical body with the fraction filling an outer zone and the solvent an inner zone therein with a somewhat cylindrical interface between them, introducing the solvent into that mass adjacent to the bottom thereof, withdrawing solvent containing extracted material inside the interface at the top thereof, withdrawing for recycling a stream of the fraction outside the interface and reintroducing it at a plurality of locations into the inner cylindrical surface of the solvent in said inner zone, introducing fresh petroleum fraction into the system, withdrawing a mixture of solvent and extracted fraction across the interface, separating said mixture, and returning the separated solvent to said rotating mass.

8. The process as set forth in claim 7 in which the process is carried out in plurality of like stages in accordance with continuous countercurrent principles with the solvent entering the lowermost stage and the petroleum fraction the uppermost stage.

9. The process of hydrolyzing fatty esters which comprises rapidly rotating a mass comprising fatty esters and water at hydrolyzing temperature around a vertical axis in an annular chamber, whereby an aqueous liquid fills an outer zone and a fatty phase in inner zone therein with a somewhat cylindrical interface between them, introducing fatty esters to be hydrolyzed into said mass adjacent to the bottom thereof, withdrawing fatty material from said inner zone inside said interface at the top thereof, recycling aqueous liquid from the outer zone outside said interface through the fatty phase in the inner zone withdrawing a mixture of fatty material and aqueous liquid across the interface, separating the mixture, returning the separated fatty material to the rotating mass and introducing fresh water into the system.

10. The process as set forth in claim 5 in which the process is carried out in a plurality of like stages in accordance with continuous countercurrent principles with the fatty esters entering the lowermost stage and the water the uppermost stage.

11. The process for saponifying fatty material which comprises rapidly rotating a two-phase mass comprising fatty material and an aqueous solution of electrolyte and saponifying agent at a suitable temperature around a vertical axis in an annular chamber, whereby the mass is in the form of a somewhat cylindrical body with the aqueous solution filling an outer zone and the fatty material an inner zone therein with a somewhat cylindrical interface between them, introducing fatty material to be saponified into said mass adjacent to the bottom thereof, withdrawing saponified fatty material from the inner zone inside said interface at the top thereof, withdrawing a stream of the aqueous solution outside said interface and reintroducing it at a plurality of locations into the inner cylindrical surface of the fatty material in the inner zone, withdrawing a mixture of aqueous solution and fatty material across said interface, separating said mixture into aqueous solution and fatty material, returning the separated fatty material to the rotating mass and introducing fresh aqueous solution of electrolyte and saponifying agent into the system.

12. The process as set forth in claim 11 in which the saponification is carried out in a plurality of stages in accordance with continuous countercurrent principles with the fatty material entering the lowermost stage and the fresh aqueous solution the uppermost stage.

13. The process as set forth in claim 12 in which fresh aqueous solution of saponifying agent is also introduced at an intermediate stage.

14. The process of purifying saponification products of fatty glycerides which comprises rapidly rotating a mass comprising such saponification products and an aqueous solution of an electrolyte at a suitable temperature around a vertical axis in an annular chamber, whereby the mass in in the form of a somewhat cylindrical body with the aqueous solution filling an outer zone and the saponification products an inner zone therein with a somewhat cylindrical interface between them, introducing saponification products to be purified into said mass adjacent to the bottom thereof, withdrawing purified saponification products from the inner zone inside said interface at the top thereof, withdrawing a stream of the aqueous solution outside said interface and reintroducing it at a plurality of locations into the inner cylindrical surface of the saponification products in said inner zone so that it passes in dispersed form through the saponified products in the inner zone, withdrawing a mixture of said aqueous solution and saponification products across said interface, separating said mixture into the aqueous solution and saponification products, returning the separated saponification products to the rotating mass and introducing additional aqueous solution of electrolyte into the system.

15. The process as set forth in claim 14 in which the process is carried out in a plurality of similar stages in accordance with continuous countercurrent principles.

References Cited in the file of this patent

UNITED STATES PATENTS

| | | |
|---|---|---|
| 1,232,104 | Sharples | July 3, 1917 |
| 1,492,498 | Wait | Apr. 29, 1924 |
| 2,209,577 | Podbielniak | July 30, 1940 |
| 2,286,157 | Podbielniak | June 9, 1942 |
| 2,291,849 | Tomlinson | Aug. 4, 1942 |
| 2,300,751 | Scott et al. | Nov. 3, 1942 |
| 2,335,457 | Sender | Nov. 30, 1943 |
| 2,346,491 | Kiersted | Apr. 11, 1944 |
| 2,411,468 | Sender | Nov. 19, 1946 |
| 2,474,007 | Maycock | June 21, 1949 |
| 2,480,471 | Ittner | Aug. 30, 1949 |
| 2,584,424 | Cornell | Feb. 5, 1952 |
| 2,626,889 | Carney | Jan. 27, 1953 |
| 2,670,132 | Podbielniak | Feb. 23, 1954 |
| 2,672,406 | Carney | Mar. 16, 1954 |